US012451604B2

(12) United States Patent
Chen et al.

(10) Patent No.: US 12,451,604 B2
(45) Date of Patent: Oct. 21, 2025

(54) MULTI-BAND ANTENNA

(71) Applicant: Outdoor Wireless Networks LLC, Claremont, NC (US)

(72) Inventors: Changfu Chen, Suzhou (CN); Pengfei Guo, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 483 days.

(21) Appl. No.: 18/093,361

(22) Filed: Jan. 5, 2023

(65) Prior Publication Data

US 2023/0216197 A1 Jul. 6, 2023

(30) Foreign Application Priority Data

Jan. 6, 2022 (CN) ........................ 202210007640.X

(51) Int. Cl.
*H01Q 21/26* (2006.01)
*H01Q 5/364* (2015.01)

(52) U.S. Cl.
CPC ............. *H01Q 5/364* (2015.01); *H01Q 21/26* (2013.01)

(58) Field of Classification Search
CPC .......... H01Q 5/364; H01Q 21/26; H01Q 5/42; H01Q 15/0013; H01Q 19/10; H01Q 21/24; H01Q 1/246; H01Q 1/523; H01Q 1/38; H01Q 3/00; H01Q 5/30; H01Q 15/14
See application file for complete search history.

(56) References Cited

U.S. PATENT DOCUMENTS

| | | | | |
|---|---|---|---|---|
| 7,868,842 | B2 * | 1/2011 | Chair | H01Q 1/246 343/797 |
| 2017/0310009 | A1 | 10/2017 | Isik et al. | |
| 2018/0040948 | A1 | 2/2018 | Göttl et al. | |
| 2019/0372204 | A1 * | 12/2019 | Varnoosfaderani | H01Q 1/523 |
| 2021/0320413 | A1 * | 10/2021 | Wu | H01Q 1/246 |
| 2021/0391647 | A1 | 12/2021 | Guo et al. | |
| 2021/0391657 | A1 * | 12/2021 | Chen | H01Q 21/26 |

FOREIGN PATENT DOCUMENTS

EP 3893328 A1 10/2021

OTHER PUBLICATIONS

"European Search Report in Corresponding Application No. 23150348.3, mailed May 25, 2023, 12 pages".

* cited by examiner

*Primary Examiner* — Dameon E Levi
*Assistant Examiner* — Michael M Bouizza
(74) *Attorney, Agent, or Firm* — Myers Bigel, P.A.

(57) ABSTRACT

A multi-band antenna includes a first column of radiating elements that are configured to operate in a first operating frequency band mounted on a reflecting plate; a second column of radiating elements that are configured to operate in a second operating frequency band mounted on the reflecting plate; a first fence and a second fence located on both sides of the reflecting plate that extend forward from the reflecting plate, where the first and second columns of radiating elements are arranged in between the first and second fences, the first fence and the second fence respectively comprise a frequency selective surface with a passband and a stopband, the passband covers at least the first operating frequency band, and the stopband covers at least the second operating frequency band.

25 Claims, 5 Drawing Sheets

MULTI-BAND ANTENNA

CROSS-REFERENCE TO RELATED APPLICATION

The present application claims priority to Chinese Patent Application No. 202210007640.X, filed Jan. 6, 2022, the entire content of which is incorporated herein by reference as if set forth fully herein.

FIELD

The present disclosure relates to a communication system, and more specifically, to a multiband antenna.

BACKGROUND

Cellular communications systems are well known in the art. In a cellular communications system, a geographic area is divided into a series of regions that are referred to as "cells" which are served by respective base stations. The base station may include one or more base station antennas that are configured to provide two-way radio frequency ("RF") communications with mobile subscribers that are within the cell served by the base station.

In many cases, each base station is divided into "sectors". In perhaps the most common configuration, a small hexagonally shaped cell is divided into three 120° sectors, and each sector is served by one or more base station antennas that generate radiation patterns or "antenna beams" that have an azimuth half power beam width (HPBW) of approximately 65°. Typically, the base station antennas are mounted on a tower structure, with the antenna beams that are generated by the base station antennas directed outwardly. Base station antennas are often realized as linear or planar phased arrays of radiating elements.

In order to accommodate the ever-increasing volumes of cellular communications, cellular operators have added cellular services in a variety of new frequency bands. While in some cases it is possible to use linear arrays of so-called "wideband" or "ultra-wideband" radiating elements to provide service in multiple frequency bands, in other cases it is necessary to use different linear arrays or planar arrays of radiating elements to support service in the different frequency bands.

As the number of frequency bands has proliferated, increased sectorization has become more common (e.g., dividing a cell into six, nine or even twelve sectors), and the number of base station antennas deployed at a typical base station has increased significantly. However, due to local zoning ordinances and/or weight and wind loading constraints for the antenna towers, etc. there is often a limit as to the number of base station antennas that can be deployed at a given base station. In order to increase capacity without further increasing the number of base station antennas, so-called multi-band antennas have been introduced in which multiple arrays of radiating elements are included in a single antenna. One very common multi-band antenna includes one linear array of "low-band" radiating elements that are used to provide service in some or all of the 617 to 960 MHz frequency band, and two linear arrays of "mid-band" radiating elements that are used to provide service in some or all of the 1427 to 2690 MHz frequency band. These linear arrays of low-band and mid-band radiating elements are typically mounted in a side-by-side fashion.

In order to implement this type of multiband antenna in a commercially acceptable manner, the undesired parasitic coupling that may occur in the multiband antenna should be reduced as much as possible. These parasitic couplings may occur between the radiating element arrays of different frequency bands. These parasitic couplings may cause distortion of the radiation pattern, such as a reduction in the front-to-back ratio and an increase in HPBW.

In addition, in order to implement such multiband antenna in a commercially acceptable manner, the width of the base station antenna needs to be kept within an acceptable dimension range. It is desirable that the multiband antenna has a high degree of compactness and integration.

SUMMARY

According to a first aspect of the present disclosure, a multiband antenna is provided, wherein the multiband antenna extends in the longitudinal direction, and the multiband antenna comprises: a first column of radiating elements mounted on a base surface of a reflecting plate, which is configured to operate in a first operating frequency band and comprises a plurality of first radiating elements arranged along the longitudinal direction; a second column of radiating elements mounted on the base surface of the reflecting plate, which is configured to operate in a second operating frequency band that is different from the first operating frequency band and comprises a plurality of second radiating elements arranged along the longitudinal direction; a first fence and a second fence located on both sides of the reflecting plate that extend forward from the base surface of the reflecting plate, wherein the first column of radiating elements and the second column of radiating elements are arranged in between the first fence and the second fence, the first fence and the second fence respectively comprise a frequency selective surface with a passband and a stopband, the passband covers at least the first operating frequency band, and the stopband covers at least the second operating frequency band.

According to a second aspect of the present disclosure, a multiband antenna is provided, wherein the multiband antenna comprises: a first column of radiating elements mounted on a base surface of a reflecting plate, which is configured to operate in a first operating frequency band; a second column of radiating elements mounted on the base surface of the reflecting plate, which is configured to operate in a second operating frequency band that is different from the first operating frequency band; a first fence and a second fence located on respective opposed sides of the reflecting plate that extend forward from the base surface of the reflecting plate, wherein the first column of radiating elements and the second column of radiating elements are arranged in between the first fence and the second fence, the first fence and the second fence are configured to improve the front-to-back ratio of the radiation pattern generated by the second column of radiating elements, and the first fence and the second fence respectively comprise a frequency selective surface that is grounded to the reflecting plate.

Other features and advantages of the present disclosure will be made clear by the following detailed description of exemplary embodiments of the present disclosure with reference to the attached drawings.

Figure 1:
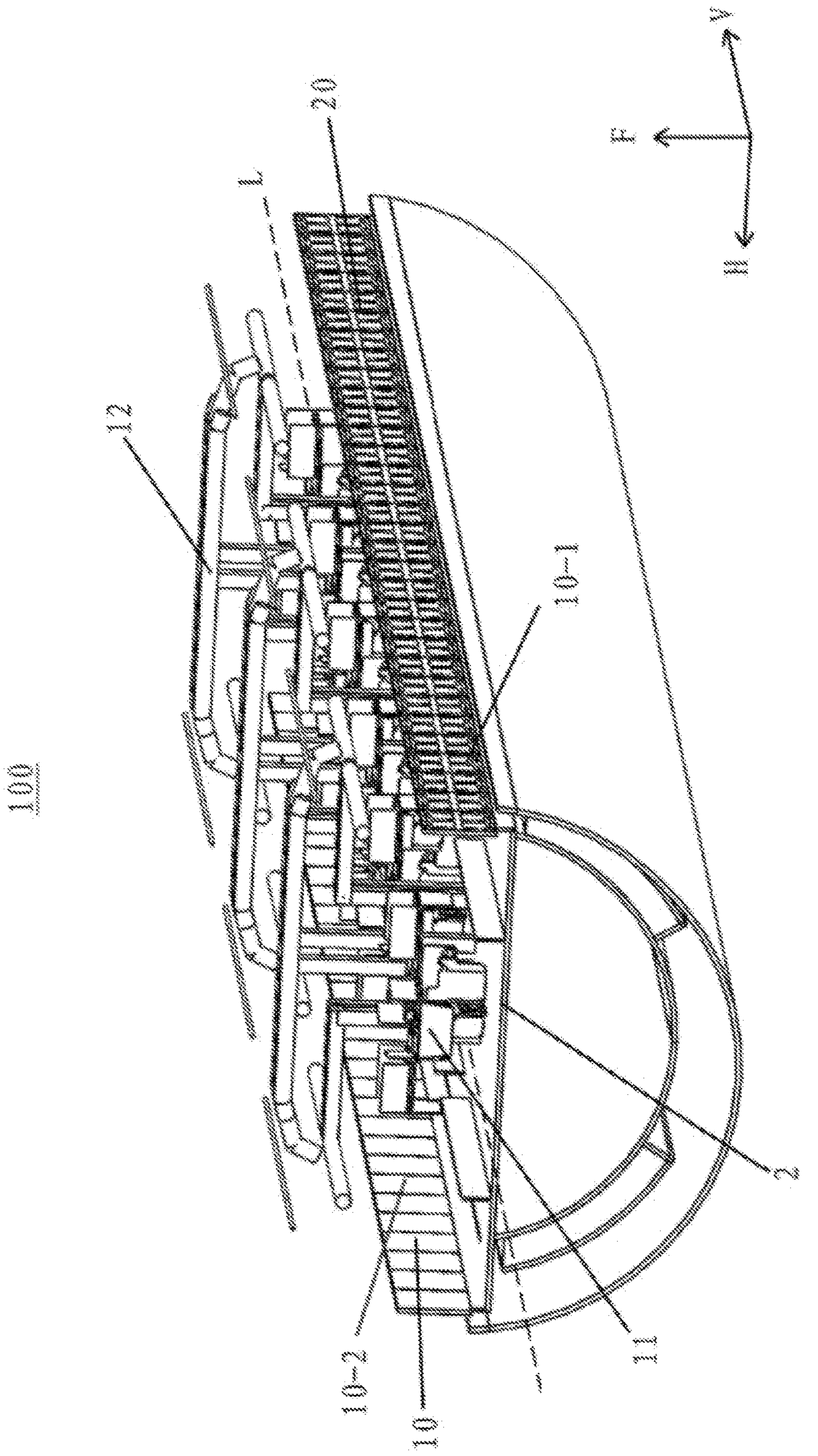
FIG. 1 is a schematic perspective view of a multi-band antenna according to some examples of the present disclosure.

Note, in the embodiments described below, the same reference signs are sometimes jointly used between different attached drawings to denote the same parts or parts with the same functions, and repeated descriptions thereof are omitted. In some cases, similar labels and letters are used to indicate similar items. Therefore, once an item is defined in one attached drawing, it does not need to be further discussed in subsequent attached drawings.

For ease of understanding, the position, dimension, and range of each structure shown in the attached drawings and the like may not indicate the actual position, dimension, and range. Therefore, the present disclosure is not limited to the position, size, range, etc. disclosed in the attached drawings.

DETAILED DESCRIPTION

The present disclosure will be described below with reference to the attached drawings, which show several examples of the present disclosure. However, it should be understood that the present disclosure can be presented in many different ways and is not limited to the examples described below. In fact, the examples described below are intended to make the present disclosure more complete and to fully explain the protection scope of the present disclosure to those skilled in the art. It should also be understood that the examples disclosed in the present disclosure may be combined in various ways so as to provide more additional examples.

It should be understood that the terms used herein are only used to describe specific examples, and are not intended to limit the scope of the present disclosure. All terms used herein (including technical terms and scientific terms) have meanings normally understood by those skilled in the art unless otherwise defined. For brevity and/or clarity, well-known functions or structures may not be further described in detail.

As used herein, when an element is said to be "on" another element, "attached" to another element, "connected" to another element, "coupled" to another element, or "in contact with" another element, etc., the element may be directly on another element, attached to another element, connected to another element, coupled to another element, or in contact with another element, or an intermediate element may be present. In contrast, if an element is described as "directly" "on" another element, "directly attached" to another element, "directly connected" to another element, "directly coupled" to another element or "directly in contact with" another element, there will be no intermediate elements. As used herein, when one feature is arranged "adjacent" to another feature, it may mean that one feature has a part overlapping with the adjacent feature or a part located above or below the adjacent feature.

In this Specification, elements, nodes or features that are "connected" together may be mentioned. Unless explicitly stated otherwise, "connected" means that one element/node/feature can be mechanically, electrically, logically or otherwise connected with another element/node/feature in a direct or indirect manner to allow interaction, even though the two features may not be directly connected. That is, "connected" means direct and indirect connection of components or other features, including connection using one or a plurality of intermediate components.

As used herein, spatial relationship terms such as "upper", "lower", "left", "right", "front", "back", "high" and "low" can explain the relationship between one feature and another in the drawings. It should be understood that, in addition to the orientations shown in the attached drawings, the terms expressing spatial relations also comprise different orientations of a device in use or operation. For example, when a device in the attached drawings rotates reversely, the features originally described as being "below" other features now can be described as being "above" the other features". The device may also be oriented by other means (rotated by 90 degrees or at other locations), and at this time, a relative spatial relation will be explained accordingly.

As used herein, the term "A or B" comprises "A and B" and "A or B", not exclusively "A" or "B", unless otherwise specified.

As used herein, the term "exemplary" means "serving as an example, instance or explanation", not as a "model" to be accurately copied". Any realization method described exemplarily herein may not be necessarily interpreted as being preferable or advantageous over other realization methods. Furthermore, the present disclosure is not limited by any expressed or implied theory given in the above technical field, background art, summary of the invention or specific embodiments.

As used herein, the word "basically" means including any minor changes caused by design or manufacturing defects, device or component tolerances, environmental influences, and/or other factors. The word "basically" also allows for the divergence from the perfect or ideal situation due to parasitic effects, noise, and other practical considerations that may be present in the actual realization.

In addition, for reference purposes only, "first", "second" and similar terms may also be used herein, and thus are not intended to be limitative. For example, unless the context clearly indicates, the words "first", "second" and other such numerical words involving structures or elements do not imply a sequence or order.

It should also be understood that when the term "comprise/include" is used herein, it indicates the presence of the specified feature, entirety, step, operation, unit and/or component, but does not exclude the presence or addition of one or a plurality of other features, steps, operations, units and/or components and/or combinations thereof.

Fence structures and other parasitic elements are often used to shape the antenna beams generated by a base station antenna. Herein the term "parasitic element" refers to a conductive structure, that is not connected to an RF source, that are used to shape the radiation patterns generated by an array of radiating elements that is connected to the RF source. Parasitic elements may also be referred to as "tuning elements' herein In a multiband antenna, undesired parasitic coupling may occur between a tuning element and one or more radiating elements. For example, a tuning element that is provided to adjust the shape of an antenna beam generated by a first array of radiating elements may also act to adjust the shape of an antenna beam generated by a second array of radiating elements, often in undesirable ways. The inventor found that: in some cases, a fence used to adjust the radiation pattern of a specific frequency band (for example, low frequency band) may negatively affect the radiation pattern of other frequency bands (for example, the medium frequency band). However, because the fence is important for the radiation pattern of the specific frequency band, such as the front-to-back ratio performance, the fence cannot simply be omitted. A new type of fence 10 comprising a frequency selective surface 20 is proposed for the multiband antenna 100 according to the present disclosure. The frequency selective surface 20 is capable of filtering electromagnetic waves in space. By periodically arranging a plurality of frequency selective surface units 22 on a two-dimensional plane, a metamaterial with a specific reflection/transmission phase distribution may be formed. When electromagnetic waves are incident on the frequency selective surface 20, the frequency selective surface 20 is able to selectively pass/block electromagnetic waves of different frequencies. Therefore, the multiband antenna 100 according to the present disclosure is capable of reducing the negative effect on the radiation pattern of other frequency bands (for example, medium frequency band) while maintaining the positive effect on the radiation pattern of a specific frequency band (for example, low frequency band).

Figure 2:
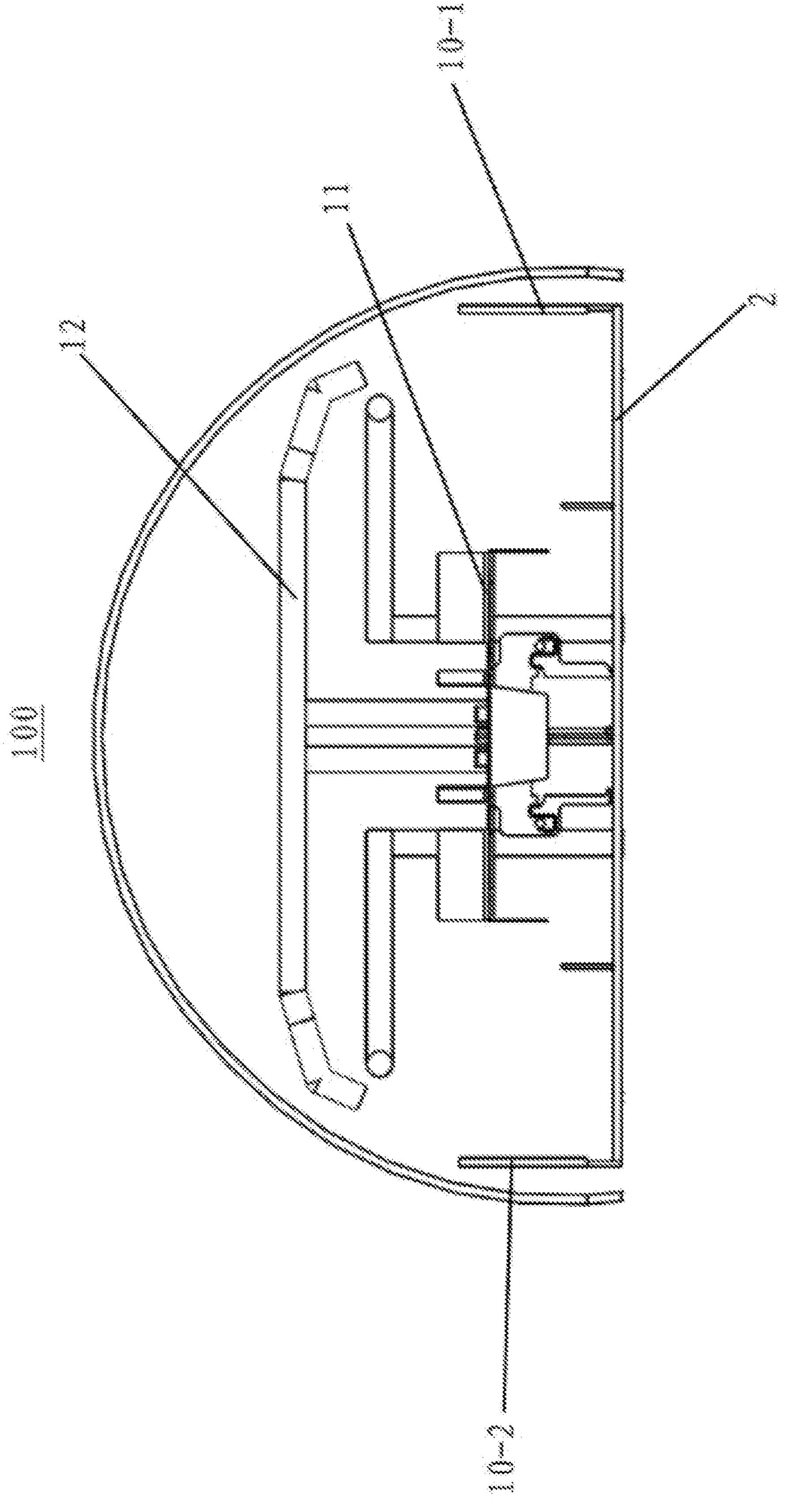
FIG. 2 is a schematic end view of the multiband antenna in FIG. 1.
Figure 3:
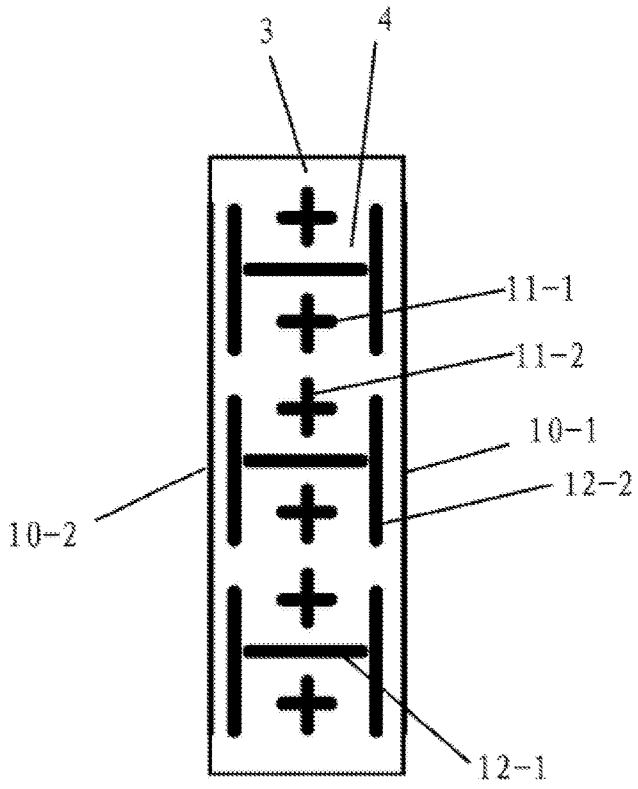
FIG. 3 is a schematic front view of the multiband antenna in FIG. 1 with the radome removed.

An exemplary multiband antenna 100 according to some embodiments of the present disclosure will now be described in detail with reference to FIGS. 1 to 3. FIG. 1 is a schematic perspective view of the multiband antenna 100 according to some embodiments of the present disclosure with the front radome thereof omitted; FIG. 2 is a schematic end view of the multiband antenna 100 of FIG. 1, with the rear radome thereof omitted; FIG. 3 is a schematic front view of the multiband antenna 100 of FIG. 1. It should be noted that, the actual multiband antenna 100 may also have other components, and in order to avoid obscuring the main points of the present disclosure, the other components are not shown in the attached drawings and will not be discussed herein.

As shown in FIGS. 1 to 3, the multiband antenna 100 may comprise a circular radome, and only the rear radome is shown in FIG. 1 and only the front radome is shown in FIG. 2. The multiband antenna 100 may comprise a first column of radiating elements 3 and a second column of radiating elements 4 mounted on a base surface 2 of a reflecting plate. The first column of radiating elements 3 comprises a plurality of first radiating elements 11 arranged in the longitudinal direction V and configured to operate in a first operating frequency band. The second column of radiating elements 4 comprises a plurality of second radiating elements 12 arranged in a row on the longitudinal direction V and configured to operate in a second operating frequency band. The longitudinal direction V may be the direction of the longitudinal axis L of the multiband antenna 100 or may be parallel to the longitudinal axis L. The longitudinal direction V is perpendicular to the horizontal direction H and the forward direction F (see FIG. 1). Each radiating element is mounted to extend forwardly (along the forward direction F) from the reflecting plate. The reflecting plate may serve as the ground plane structure of the radiating elements 11 and 12.

In the embodiments of FIGS. 1 to 3, the first radiating element 11 may be configured as a mid-band radiating element, and the operating frequency band of the mid-band radiating element may be at least a portion of the 1427-2690 MHz frequency range. The second radiating element may be configured as a low-band radiating element, and the operating frequency band of the low-band radiating element may be at least a portion of the 617-960 MHz frequency range. The low-band radiating element may extend farther forward from the base surface 2 of the reflecting plate than the mid-band radiating element. It should be understood that the first radiating element 11 and/or the second radiating element may also be configured as a radiating element that can operate in other frequency bands. For example, the first radiating element 11 may also be configured as a high-band radiating element or a low-band radiating element, and the second radiating element 12 may also be configured as a mid-band radiating element or a high-band radiating element, wherein the operating frequency band of the high-band radiating element may be at least a portion of the 3000-5000 MHz frequency range.

The multiband antenna 100 may further comprise, for example, a first fence 10-1 and a second fence 10-2 extending longitudinally on both sides of the reflecting plate, and the first fence 10-1 and the second fence 10-2 may extend forwardly from the base surface 2 of the reflecting plate. The first fence 10-1 and the second fence 10-2 may, together with the base surface 2 of the reflecting plate, form the reflecting plate. In general, the first fence 10-1 and the second fence 10-2 may be configured as an integrated structure with the base surface 2 of the reflecting plate (i.e., a single sheet of aluminum may be bent to form the base surface 2 of the reflecting plate and the first and second fences 10-1, 10-2). In some embodiments, the first fence 10-1 and the second fence 10-2 may also be separate from the base surface 2 of the reflecting plate. The first column of radiating elements 3 and the second column of radiating elements 4 may be arranged between the first fence 10-1 and the second fence 10-2.

The first fence 10-1 and the second fence 10-2 are capable of improving the radiation pattern performance of the radiating element array of a specific frequency band based on the parasitic coupling with the radiating element array of the specific frequency band. In the illustrated embodiment, the first fence 10-1 and the second fence 10-2 may be configured to improve the radiation pattern of the low-band radiating element array, for example, the front-to-back ratio performance of the radiation pattern. When the multiband antenna 100 is designed as a compact antenna, the first fence 10-1 and the second fence 10-2 become even more important for improving the front-to-back ratio performance of the radiation pattern of the low-band radiating element array, because the base surface 2 of the reflecting plate cannot be designed to have a wider dimension that is beneficial to the front-to-back ratio performance.

As shown in FIG. 3, the multiband antenna 100 may be designed as a compact antenna. In other words, the multiband antenna 100 may have a smaller size. For example, in some cases, it is commercially required that the horizontal dimension of the base station antenna is less than 200 mm, 190 mm, or even less than 180 mm. In order to maintain a compact arrangement structure, the first column of radiating elements 3 and the second column of radiating elements 4 may form a collinear layout, that is to say, the central extension line of a first column of radiating elements 3 may be substantially collinear or overlapped with the central extension line of a second column of radiating elements 4. As shown in FIGS. 2 and 3, each first radiating element 11 may comprise a first radiator 11-1 for horizontal polarization and a second radiator 11-2 for vertical polarization that cross each other in the middle of the collinear layout. Each second radiating element 12 may comprise a first radiator 12-1 for horizontal polarization located in the middle of the collinear layout and two second radiators 12-2 for vertical polarization located on both sides of the collinear layout. In addition, the antenna size requirement may also be met by reducing the number of radiating element arrays. For example, the multiband antenna 100 may comprise only one first radiating element array 3 and only one second radiating element array 4. It should be understood that there may be various layouts for the multiband antenna 100 and it is not limited to those exemplarily introduced here.

However, the inventor also found that: The first fence 10-1 and the second fence 10-2 may negatively affect the radiation pattern of the mid-band radiating element array due to parasitic coupling, such as distorting the radiation pattern of the mid-band radiating element array. However, if the first fence 10-1 and the second fence 10-2 are removed, the front-to-back ratio performance of the radiation pattern of the low-band radiating element array will not meet the requirements. The way out of this dilemma is a technical problem that those skilled in the art urgently need to solve.

In order to minimize the undesired interference of the first fence 10-1 and the second fence 10-2 on the radiation pattern of the first column of radiating elements 3 (for example, the mid-band radiating element array) while keeping the first fence 10-1 and the second fence 10-2 in the multiband antenna 100, the first fence 10-1 and the second fence 10-2 may respectively comprise a frequency selective surface 20 with a passband and a stopband, such that the passband of the frequency selective surface 20 covers at least the first operating frequency band (for example, the medium frequency band), and the stopband of the frequency selective surface 20 covers at least the second operating frequency band (for example, the low frequency band). That is to say, when electromagnetic waves are incident on the frequency selective surface 20, the frequency selective surface 20 can pass electromagnetic waves in the first operating frequency band emitted by the first column of radiating elements 3 (for example, the mid-band radiating element array), and block and reflect electromagnetic waves in the second operating frequency band emitted by the second column of radiating elements 4 (for example, the low-band radiating element array). Thus, the undesired parasitic coupling between the first fence 10-1 and the second fence 10-2 and the mid-band radiating element array is avoided as much as possible while maintaining the desired parasitic coupling between the first fence 10-1 and the second fence 10-2 and the low-band radiating element array as much as possible.

In some embodiments of the present disclosure, the fence 10 may be integrally formed with the frequency selective surface 20. For example, the fence 10 may be constructed as a metal sheet, and the desired frequency selective surface 20 may be stamped on the fence 10. In some embodiments of the present disclosure, the fence 10 may be separately integrated with the frequency selective surface 20. For example, the fence 10 may be separately integrated with a printed circuit board on which the frequency selective surface 20 is printed. It is advantageous to arrange the frequency selective surface 20 on the sides of the first and second fences 10-1, 10-2 facing away from the first and second radiating element arrays 3, 4. That is, the frequency selective surface 20 of the first fence 10-1 and the frequency selective surface 20 of the second fence 10-2 are away from each other, so that the frequency selective surface 20 is as spaced from the first and second radiating element arrays 4 as possible. As a result, the aforementioned desired parasitic coupling is increased as much as possible, while the undesired parasitic coupling is reduced. When the multiband antenna 100 is a compact antenna, this arrangement is more advantageous.

Figure 4:
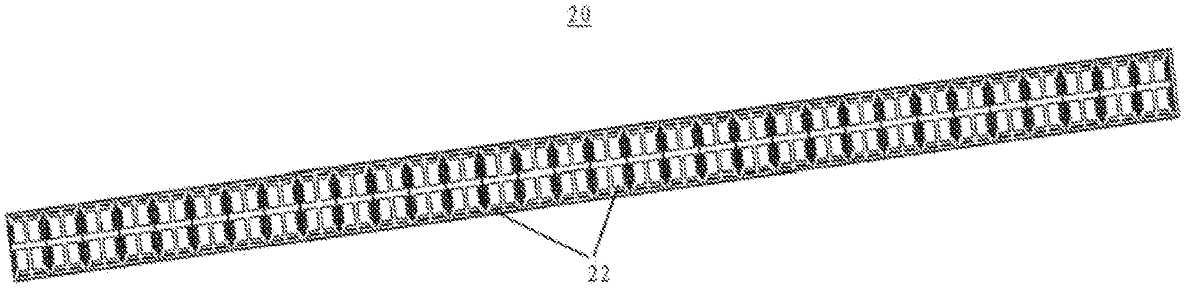
FIG. 4 is a schematic diagram of a frequency selective surface in a multiband antenna according to some embodiments of the present disclosure.
Figure 5:
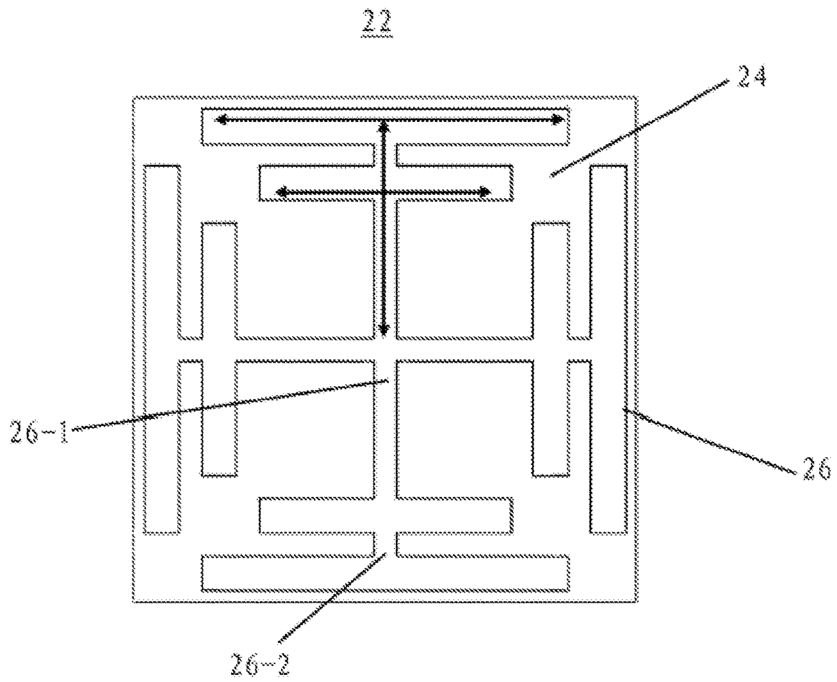
FIG. 5 is a schematic diagram of a frequency selective surface unit of the frequency selective surface in FIG. 4.
Figure 6:
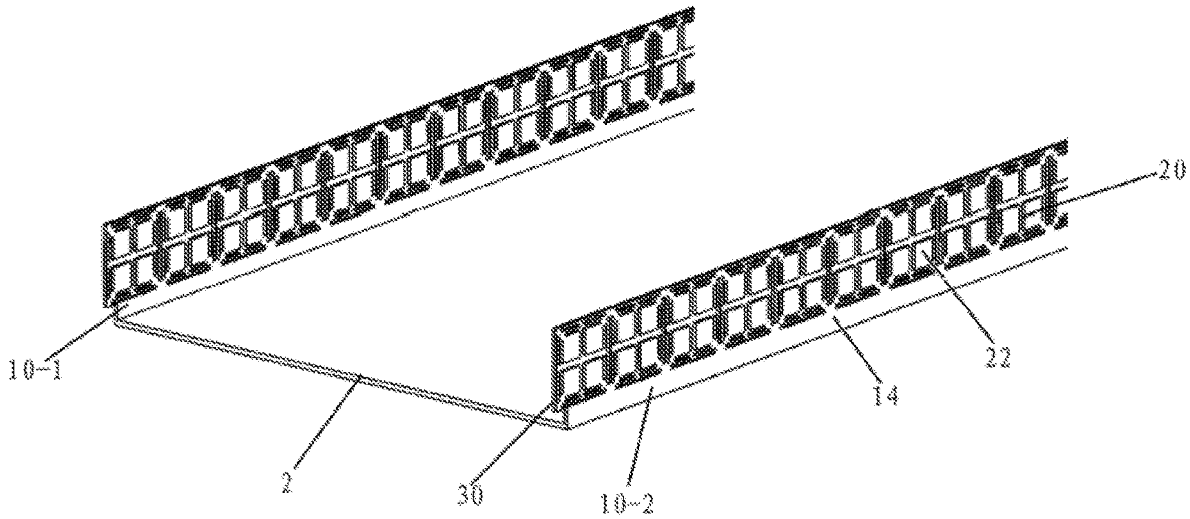
FIG. 6 is a partial schematic diagram of a first embodiment of a frequency selective surface in a multiband antenna according to some embodiments of the present disclosure.
Figure 7:
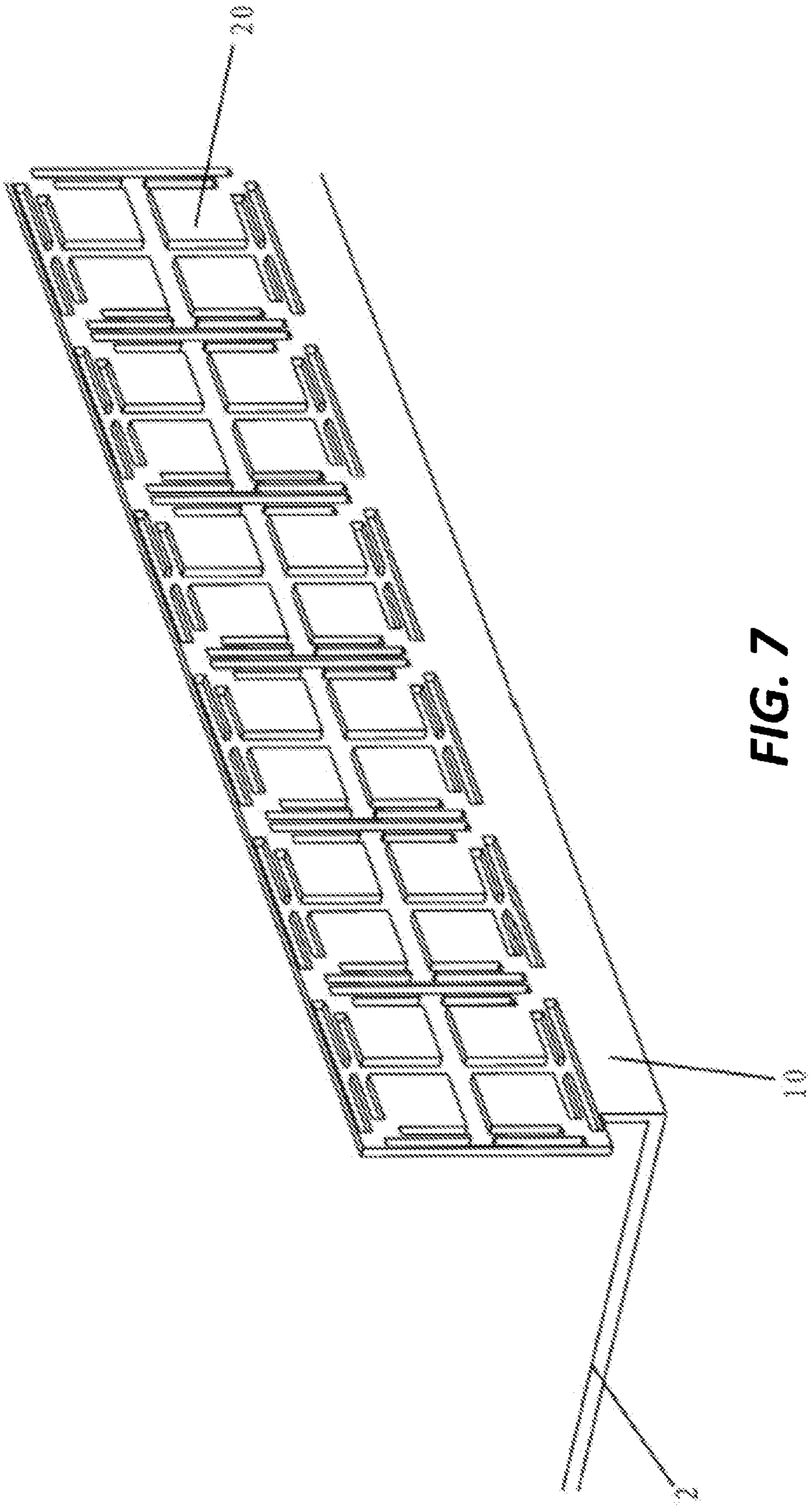
FIG. 7 is a partial schematic diagram of a second embodiment of a frequency selective surface in a multiband antenna according to some embodiments of the present disclosure.

Next, specific design solutions of the frequency selective surface 20 in the multiband antenna 100 of some embodiments of the present disclosure will be described in detail with reference to FIGS. 4 to 7. FIG. 4 is a schematic diagram of the frequency selective surface 20 in the multiband antenna 100 according to some embodiments of the present disclosure; FIG. 5 is a schematic diagram of the frequency selective surface unit 22 of the frequency selective surface 20 in FIG. 4; FIG. 6 is a partial schematic diagram of the first embodiment of frequency selective surface 20 in the multiband antenna 100 according to some embodiments of the present disclosure; FIG. 7 is a partial schematic diagram of the second embodiment of frequency selective surface 20 in the multiband antenna 100 according to some embodiments of the present disclosure.

As shown in FIG. 4, by periodically arranging a plurality of frequency selective surface units 22, such as passive resonance units, on a two-dimensional plane, a frequency selective surface 20 having a specific reflection/transmission phase distribution may be formed. In the illustrated embodiment, the frequency selective surface 20 may be configured as a one-dimensional periodic structure of the frequency selective surface unit 22 formed by an array of frequency selective surface units 22. In other embodiments, the frequency selective surface 20 may be configured as a multi-dimensional periodic structure (for example, two-dimensional or three-dimensional periodic structure) of the frequency selective surface unit 22 formed by multiple rows and multiple columns of frequency selective surface units 22.

An advantageous design solution of the frequency selective surface unit 22 as a bandpass filter is shown in FIG. 5. The frequency selective surface unit 22 may comprise a metal base surface 24 and a slot pattern 26 in which metal is removed. The slot pattern 26 may comprise a cross-shaped slot 26-1 on the center and four I-shaped slots 26-2 on the periphery that are connected to respective ends of the cross-shaped slot 26-1. The cross-shaped slot 26-1 may comprise a first slot extending in the longitudinal direction V and a second slot extending in the forward direction F. Each I-shaped slot 26-2 may comprise a third slot and a fourth slot that are spaced apart from each other, with the extension of the third slot smaller than that of the fourth slot, and a fifth slot connected between the third slot and the fourth slot. It should be understood that there may be various design forms of the frequency selective surface 20. For example, the shape of the slot pattern 26 may have different variations, such as the slot layout, etc. In some embodiments, the size parameters of the cross-shaped slot 26-1 and/or the I-shaped slot 26-2 (the various size parameters represented by arrows in the figure) may have different variations. For example, width, length, etc. of the slot.

In other embodiments, the first fence 10-1 and the second fence 10-2 may comprise a first frequency selective surface section and a second frequency selective surface section, respectively. For example, the fences 10-1, 10-2 may be configured to extend farther forwardly and the slot pattern illustrated in FIGS. 4-5 may be stamped into each fence 10-1, 10-2. In some embodiments, the size parameters of the slot pattern 26 of the frequency selective surface unit 22 in the first frequency selective surface section are different from the size parameters of the slot pattern 26 of the frequency selective surface unit in the second frequency selective surface section. For example, the size parameters of the cross-shaped slot 26-1 and/or I-shaped slot 26-2 of the frequency selective surface unit in the first frequency selective surface 20 section are different from the size parameters of the cross-shaped slot 26-1 and/or I-shaped slot 26-2 of the frequency selective surface unit in the second frequency selective surface 20 section.

It should be understood that there may be various design forms of the frequency selective surface 20 and it is not limited to the specific embodiments listed here. The resonant frequency point and/or operating bandwidth of the frequency selective surface 20 may be adjusted by designing various sizes of the frequency selective surface unit 22 to meet the requirements of different resonance points, multi-frequency resonance, and/or broadband resonance in different application scenarios.

Furthermore, the inventor also noted that: in order to maintain a beneficial effect on the front-to-back ratio performance of the low-band radiation pattern, common grounding of the frequency selective surface 20 and the reflecting plate may be implemented. In other words, the frequency selective surface 20 may be grounded to the reflecting plate.

In the embodiment of FIG. 6, the frequency selective surface 20, that is, the periodically arranged frequency selective surface units 22 may be printed on a printed circuit board 30, for example, on the main surface of the printed circuit board 30 facing away from the radiating element array. Advantageously, the frequency selective surface units 22 are configured as an integrated structure and are electrically connected to one another. This design helps to achieve the task of the present disclosure. As shown in FIG. 6, the first fence 10-1 and the second fence 10-2 may respectively comprise a metal base 14 extending forward from the base surface 2 of the reflecting plate and a printed circuit board 30 extending forward from the metal base 14. In some embodiments, the metal base 14 and the printed circuit board 30 together with the frequency selective surface 20 thereon may be substantially perpendicular to the base surface 2 of the reflecting plate. In some embodiments, the metal base 14 and the printed circuit board 30 together with the frequency selective surface 20 thereon may be arranged at an angle relative to the base surface 2 of the reflecting plate, for example, any angle of 70-110 degrees, 80-100 degrees, or 85-95 degrees. In order to realize the grounding of the frequency selective surface 20 to the reflecting plate, the metal base 14 may be configured as an integrated structure with the base surface 2 of the reflecting plate, or at least electrically connected to the base surface 2 of the reflecting plate. The frequency selective surface 20 may be electrically welded to the front end of the metal base 14 on the back end.

In the embodiment of FIG. 7, the first fence 10-1 and the second fence 10-2 may be configured as metal plates, and may be configured as an integrated structure with the base surface 2 of the reflecting plate, or at least electrically connected to the base surface 2 of the reflecting plate. As shown in FIG. 7, the frequency selective surface 20 is molded as a metallic pattern on the first fence 10-1 and the second fence 10-2. Advantageously, the frequency selective surface units 22 are configured as an integrated structure and are electrically connected to each other. This design form helps to achieve the task of the present disclosure.

Although some specific embodiments of the present disclosure have been described in detail by examples, those skilled in the art should understand that the above examples are only for illustration, not for limiting the scope of the present disclosure. The examples disclosed herein can be combined arbitrarily without departing from the spirit and scope of the present disclosure. Those skilled in the art should also understand that various modifications can be made to the examples without departing from the scope and spirit of the present disclosure. The scope of the present disclosure is defined by the Claims attached.

That which is claimed is:

1. A multiband antenna that extends in the longitudinal direction, the multiband antenna comprising:

a first column of radiating elements mounted on a base surface of a reflecting plate, which is configured to operate in a first operating frequency band and comprises a plurality of first radiating elements arranged along the longitudinal direction;

a second column of radiating elements mounted on the base surface of the reflecting plate, which is configured to operate in a second operating frequency band that is different from the first operating frequency band and comprises a plurality of second radiating elements arranged along the longitudinal direction; and a first fence and a second fence located on both sides of the reflecting plate that extend forward from the base surface of the reflecting plate, wherein the first column of radiating elements and the second column of radiating elements are arranged in between the first fence and the second fence, the first fence and the second fence respectively comprise a frequency selective surface with a passband and a stopband, the passband covers at least the first operating frequency band, and the stopband covers at least the second operating frequency band, wherein the frequency selective surface is configured to reflect electromagnetic waves in the second operating frequency band.

2. The multiband antenna according to claim 1, wherein the first fence and the second fence are configured to improve the front-to-back ratio of the radiation pattern generated by the second column of radiating elements.

3. The multiband antenna according to claim 1, wherein the frequency selective surface is grounded to the reflecting plate.

4. The multiband antenna according to claim 1, wherein the first fence and the second fence respectively comprise a metal base extending forward from the base surface of the reflecting plate and a printed circuit board extending forward from the metal base, and the frequency selective surface is provided by the printed circuit board.

5. The multiband antenna according to claim 4, wherein the frequency selective surface is electrically connected to the metal base.

6. The multiband antenna according to claim 1, wherein the first fence and the second fence are configured as metal plates.

7. The multiband antenna according to claim 6, wherein the first fence and the second fence are electrically connected to the base surface of the reflecting plate.

8. The multiband antenna according to claim 6, wherein the first fence and the second fence and the base surface of the reflecting plate are configured as an integrated structure.

9. The multiband antenna according to claim 8, wherein the frequency selective surface is molded as a metallic pattern on the first fence and the second fence.

10. The multiband antenna according to claim 1, wherein the frequency selective surface comprises a plurality of units arranged periodically.

11. The multiband antenna according to claim 10, wherein each unit comprises a metal base surface and a slot pattern; the slot pattern, in which metal is removed, comprises a cross-shaped slot in the center and an I-shaped slot on the periphery that is connected to one end of the cross-shaped slot.

12. The multiband antenna according to claim 11, wherein the slot pattern comprises four I-shaped slots that are connected to respective ends of the cross-shaped slot.

13. The multiband antenna according to claim 11, wherein each I-shaped slot comprises a third slot and a fourth slot that are spaced apart from each other, and a fifth slot that is connected between the third slot and the fourth slot.

14. The multiband antenna according to claim 13, wherein the extension of the third slot is smaller than that of the fourth slot.

15. The multiband antenna according to claim 14, wherein each third slot is directly connected to one end of the cross-shaped slot.

16. The multiband antenna according to claim 11, wherein the first fence and the second fence comprise a first frequency selective surface section and a second frequency selective surface section, respectively, and the size parameters of the slot pattern of a plurality of units that comprise the first frequency selective surface section are different from the size parameters of the slot pattern of a plurality of units that comprise the second frequency selective surface section.

17. The multiband antenna according to claim 16, wherein the size parameters of the cross-shaped slot and/or the I-shaped slot of the plurality of units in the first frequency selective surface section are different from the size parameters of the cross-shaped slot and/or the I-shaped slot of the plurality of units in the second frequency selective surface section.

18. The multiband antenna according to claim 1, wherein each first radiating element comprises a first radiator for a first polarization and a second radiator for a second polarization that cross each other in the middle of a collinear layout; and each second radiating element comprises a first radiator for the first polarization located in the middle of the collinear layout and two second radiators for the second polarization on both sides of the collinear layout, wherein the first polarization is a horizontal polarization, and the second polarization is a vertical polarization.

19. The multiband antenna according to claim 1, wherein the frequency selective surface is provided on sides of the first and second fences facing away from the first and second radiating element arrays.

20. A multiband antenna, comprising:

a first column of radiating elements mounted on a base surface of a reflecting plate, which is configured to operate in a first operating frequency band;

a second column of radiating elements mounted on the base surface of the reflecting plate, which is configured to operate in a second operating frequency band that is different from the first operating frequency band;

a first fence and a second fence located on respective laterally spaced apart, opposed sides of the reflecting plate that extend forward from the base surface of the reflecting plate, wherein the first column of radiating elements and the second column of radiating elements are arranged between the first fence and the second fence, wherein the first fence and the second fence are configured to improve a front-to-back ratio of the radiation pattern generated by the second column of radiating elements, and wherein the first fence and the second fence each comprise a frequency selective surface that is grounded to the reflecting plate, wherein the frequency selective surface is configured to allow electromagnetic waves in the first operating frequency band to pass through the frequency selective surface and is configured to reflect electromagnetic waves in the second operating frequency band.

21. A multiband antenna that extends in a longitudinal direction, the multiband antenna comprising:

a first column of radiating elements extending forward of a base surface of a reflecting plate, the first column of radiating elements is configured to operate in a first operating frequency band;

a second column of radiating elements extending forward of the base surface of the reflecting plate, the second column of radiating elements is configured to operate in a second operating frequency band that is different from the first operating frequency band; and a first fence and a second fence that extend in the longitudinal direction, perpendicular to the base surface of the base plate and that are laterally spaced apart and extend forward from the base surface of the reflecting plate, wherein the first column of radiating elements and the second column of radiating elements are arranged between the first fence and the second fence, wherein the first fence and the second fence each comprise a frequency selective surface with a passband and a stopband, and wherein the passband covers at least the first operating frequency band and the stopband covers at least the second operating frequency band, wherein the first fence and the second fence each comprise a plurality of frequency selective surface units that are arranged in multiple rows and columns.

22. The multiband antenna according to claim 21, wherein the first fence and the second fence respectively comprise a metal base extending forward from the base surface of the reflecting plate that is coupled to the reflecting plate and to the frequency selective surface.

23. The multiband antenna according to claim 22, wherein a first printed circuit board extends forward from the metal base of the first fence and provides the frequency selective surface of the first fence, and wherein a second printed circuit board extends forward of the metal base of the second fence and provides the frequency selective surface of the second fence.

24. The multiband antenna according to claim 22, wherein the first column of radiating elements are mid-band radiating elements, and wherein the second column of radiating elements are low band radiating elements.

25. The multiband antenna according to claim 24, wherein, the frequency selective surface of each of the first and second fences are configured so that when electromagnetic waves are incident on a respective frequency selective surface, the frequency selective surface passes electromagnetic waves in the first operating frequency band emitted by the first column of radiating elements and blocks and reflects electromagnetic waves in the second operating frequency band emitted by the second column of radiating elements.

* * * * *